(12) United States Patent
Abe et al.

(10) Patent No.: US 7,616,552 B2
(45) Date of Patent: Nov. 10, 2009

(54) PHASE-CHANGE OPTICAL RECORDING MEDIUM HAVING FIRST AND SECOND TRACK PITCHES

(75) Inventors: Shinya Abe, Kadoma (JP); Shin-ichi Tanaka, Kyotanabe (JP); Hiroshi Ogawa, Tokyo (JP); Jacobus Petrus Josephus Heemskerk, Eindhoven (NL); Tamotsu Yamagami, Tokyo (JP); Cornelis Marinus Schep, Eindhoven (NL)

(73) Assignees: Koninklijke Philips Electronics, N.V., Eindhoven (NL); Panasonic Corporation, Osaka (JP); Sony Corporation, Tokyo (JP)

( * ) Notice: Subject to any disclaimer, the term of this patent is extended or adjusted under 35 U.S.C. 154(b) by 639 days.

(21) Appl. No.: 10/504,292

(22) PCT Filed: Feb. 10, 2003

(86) PCT No.: PCT/JP03/01367

§ 371 (c)(1),
(2), (4) Date: Mar. 24, 2005

(87) PCT Pub. No.: WO03/069609

PCT Pub. Date: Aug. 21, 2003

(65) Prior Publication Data

US 2005/0169158 A1      Aug. 4, 2005

(30) Foreign Application Priority Data

Feb. 18, 2002    (JP) .............................. 2002-040137

(51) Int. Cl.
*G11B 7/24* (2006.01)
(52) U.S. Cl. ............. 369/275.4; 369/275.2; 430/270.13

(58) Field of Classification Search .............. 369/275.4, 369/275.2, 275.1; 428/64.1; 430/321, 270.1, 430/270.11, 270.13
See application file for complete search history.

(56) References Cited

U.S. PATENT DOCUMENTS

| | | | |
|---|---|---|---|
| 6,081,785 A * | 6/2000 | Oshima et al. | .................. 705/1 |
| 6,300,041 B1 | 10/2001 | Masuhara et al. | |
| 6,507,557 B1 * | 1/2003 | Ohno et al. | .............. 369/275.3 |
| 6,519,213 B1 * | 2/2003 | Song et al. | ................ 369/44.26 |
| 6,550,009 B1 * | 4/2003 | Uranaka et al. | ............. 713/168 |
| 7,061,850 B1 * | 6/2006 | Irie et al. | .................. 369/275.3 |

(Continued)

FOREIGN PATENT DOCUMENTS

CN            1321301 A        11/2001

(Continued)

OTHER PUBLICATIONS

Computer Translation of JP 2000-057632 (Feb. 25, 2000 ).*

*Primary Examiner*—Tan X Dinh
(74) *Attorney, Agent, or Firm*—Wenderoth, Lind & Ponack, L.L.P.

(57) ABSTRACT

An optical disc or other optical recording medium enables reading barcode-shaped-BCA marks in a burst cutting area (BCA) with tracking on while making tampering with the BCA marks difficult. The optical disc 100 has a first area 102 containing tracks at a first track pitch d2, and a second area 101 containing tracks at a second track pitch d1. The barcode-shaped marks 104 are recorded in the second area, and the second track pitch is wider than the first track pitch.

9 Claims, 13 Drawing Sheets

U.S. PATENT DOCUMENTS

| | | | |
|---|---|---|---|
| 7,239,601 B2* | 7/2007 | Sato et al. | 369/275.3 |
| 2002/0027869 A1* | 3/2002 | Morita et al. | 369/275.4 |
| 2003/0174602 A1* | 9/2003 | Abe et al. | 369/47.4 |
| 2004/0264360 A1* | 12/2004 | Lee et al. | 369/275.4 |
| 2005/0201260 A1* | 9/2005 | Kawaguchi et al. | 369/275.4 |
| 2006/0104194 A1* | 5/2006 | Ota et al. | 369/275.4 |
| 2006/0114806 A1* | 6/2006 | Ootera et al. | 369/275.1 |
| 2006/0114807 A1* | 6/2006 | Ootera et al. | 369/275.1 |
| 2006/0171269 A1* | 8/2006 | Hiramatsu et al. | 369/275.4 |
| 2007/0280095 A1* | 12/2007 | Yoshida et al. | 369/275.4 |
| 2008/0316907 A1* | 12/2008 | Suwabe et al. | 369/275.4 |
| 2009/0129252 A1* | 5/2009 | Endoh et al. | 369/275.4 |

FOREIGN PATENT DOCUMENTS

| | | |
|---|---|---|
| EP | 1 102 263 | 5/2001 |
| EP | 1 152 402 | 11/2001 |
| JP | 2000-57632 | 2/2000 |
| WO | 01/63620 | 8/2001 |

* cited by examiner

PHASE-CHANGE OPTICAL RECORDING MEDIUM HAVING FIRST AND SECOND TRACK PITCHES

TECHNICAL FIELD

The present invention relates to an optical disc or other optical recording medium, and relates more particularly to an optical recording medium to which barcode-shaped marks are recorded.

BACKGROUND ART

A barcode containing a serial number, lot number, or other identifying code has conventionally been imprinted on optical discs as a means of identifying whether a disc is an authorized disc or a pirated copy.

A method for recording barcode-shaped marks (below a "BCA mark") to a burst cutting area (BCA) and reading this BCA mark with the optical head of the optical disc playback drive has been proposed and implemented for use with DVD media in particular.

Prepits and pregrooves are formed in the BCA of DVD media at the same track pitch used in the read-only area where read-only data is recorded and in the read-write area that is both readable and writable. A problem with write-once and read/write discs is the danger of the BCA mark in the BCA being erased or altered by the read/write drive. Tampering with the BCA mark during the production of pirated copies is a particular problem because legal copies and pirated copies cannot then be distinguished.

Furthermore, if pregrooves and prepits are not formed in the BCA where the BCA mark is recorded, that is, if the BCA is a mirror surface area, the optical head cannot track properly for the detection and playback of the barcode-shaped BCA mark recorded in the BCA. In this case the optical head can only be positioned to the precision of the drive mechanism used to move the optical head. The average user, however, could use various types of drives, and it is therefore necessary to employ a design that accounts for variation between different drives.

An object of the present invention is therefore to make tampering with the BCA mark difficult in an optical disc or other optical recording medium while enabling a barcode-shaped BCA mark in the BCA to be reproduced with tracking control.

DISCLOSURE OF INVENTION

To achieve the object an optical recording medium according to the present invention has prepit or pregroove on tracks in a BCA region where BCA marks or other barcode-shaped marks are recorded, and the track pitch of these tracks is specifically greater than the track pitch of a track in a read-only area or read/write area used to record the actual user data or disc information. This makes it difficult to alter barcode-shaped BCA marks in the BCA. Tracking in the BCA is also enabled by forming prepits or pregrooves in the BCA.

Another novel feature of an optical recording medium according to the present invention is a guard region for changing the track pitch disposed between the BCA and the read-only area or read/write area of a different track pitch beside the BCA. This is described more specifically below.

An optical recording medium according to the present invention has a first area containing tracks at a first track pitch and a second area containing tracks at a second track pitch. A plurality of barcode-shaped marks is formed in the second area, and the second track pitch is wider than the first track pitch. This optical recording medium can thus achieve the above object.

Preferably, the barcode-shaped marks are linearly shaped marks arrayed in the circumferential direction and extending in the radial direction across multiple tracks in the second area.

Further preferably, the second area has prepits or pregrooves formed therein along the track.

Yet further preferably, the second area has a stack for recording information.

Yet further preferably, the stack for recording information is a phase-change recording stack. The marks are formed by a pattern using both a crystalline phase and amorphous phase of the phase-change recording stack, and the second track pitch is at least five times the first track pitch.

Yet further preferably, a guard area for changing the track pitch is formed between the first area and second area.

Yet further preferably, the first area track and the second area track continue as uninterrupted in this guard area.

Alternatively, the first area track is not continuous to the second area track in the guard area.

Yet further preferably, uninterrupted prepits or pregrooves are formed in the first area and in the second area.

The above object is also achieved by a method according to the present invention for reading information from an optical recording medium having a first area including a track with a first track pitch for recording specific information and a second area including a track with a second track pitch where prepits or pregrooves are formed along the track and a mark for identifying the optical recording medium is recorded in the second area. This reading method includes a step for obtaining first mark information by tracking the prepits or pregrooves and reading the mark from the second area; a step for obtaining second mark information by reading the mark from the second area with tracking off; a step for comparing the first mark information and the second mark information to determine if the first mark information and the second mark information are the same information; and a step for reproducing the specific information if the first mark information and second mark information are determined the same.

Other objects and attainments together with a fuller understanding of the invention will become apparent and appreciated by referring to the following description and claims taken in conjunction with the accompanying drawings.

BRIEF DESCRIPTION OF DRAWINGS

The present invention will become readily understood from the following description of preferred embodiments thereof made with reference to the accompanying drawings, in which like parts are designated by like reference numeral and in which.

BEST MODE FOR CARRYING OUT THE INVENTION

Preferred embodiments of the present invention are described below with reference to the accompanying figures. The present invention is described in the following order. First, (1) the structure of an optical disc as an optical data recording medium is described. A process for manufacturing this optical disc is then described, including (2) producing the disc master, (3) producing an optical disc using the disc master, and (4) forming the burst cutting area (BCA) marks. A (5) method for playing the optical disc is described last.

(1) Optical Disc Structure

Figure 1:
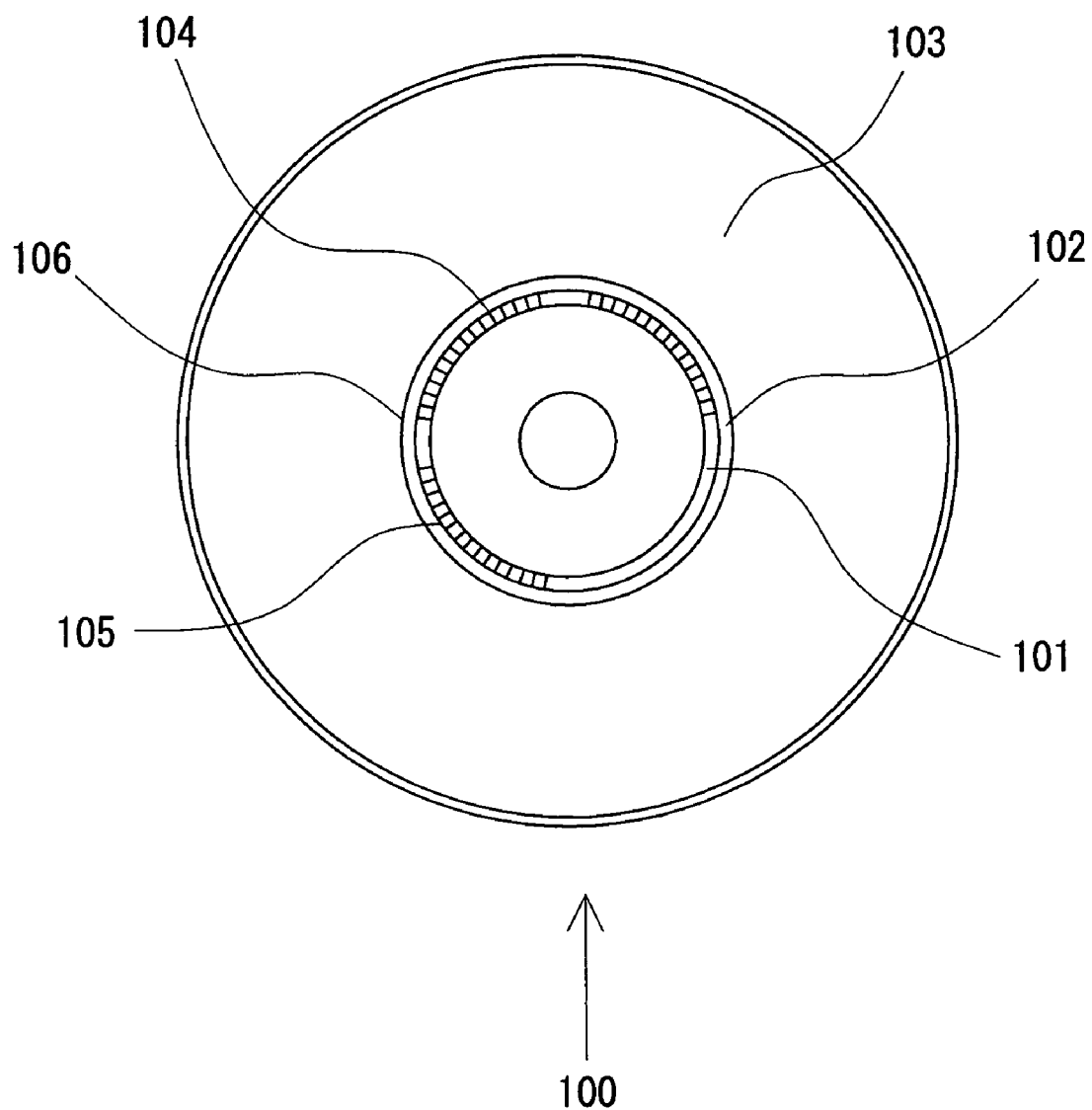
FIG. 1 is a top view of an optical disc according to a preferred embodiment of the present invention.

FIG. 1 is a top view of an optical disc 100 according to a preferred embodiment of the present invention. This optical disc 100 is a donut-shaped disk 1.2 mm thick with a 120 mm diameter and a 15 mm center hole. A 0.1 mm thick transparent layer is formed on the data recording surface of the optical disc 100. Data can be recorded to and recorded data can be read from the optical disc 100 by emitting a laser with an approximately 405 nm wavelength from an optical head with a 0.85 numerical aperture through the transparent layer. More specifically, this optical disc 100 is a readable/writable optical disc that can be used to record and read data using a phase-change recording stack.

This optical disc 100 has three data recording areas for recording information. In sequence from the inside circumference of the disc these areas are the BCA 101, read-only area 102, and read/write area 103. A first guard area 105 for changing the track pitch is also located between the BCA 101 and read-only area 102, and a second guard area 106 for similarly changing the track pitch is disposed between the read-only area 102 and read/write area 103.

A phase-change stack is formed in the data recording areas, that is, BCA 101, read-only area 102, and read/write area 103. This phase-change stack can be changed between crystalline and amorphous states by emitting a laser from the optical head.

Pre-grooves formed when the optical disc 100 is manufactured are disposed in the BCA 101, read-only area 102, and read/write area 103. The track pitch d1 of these pre-grooves in the BCA 101 is 2.0 μm, track pitch d2 in the read-only area 102 is 0.35 μm, and track pitch (not shown) in the read/write area 103 is 0.32 μm. Using the above-noted optical head and laser, the track pitch is preferably approximately 0.4 μm or less based on calculations using the difference between the numerical aperture of the optical head and the wavelength of the laser. It should be noted that currently available DVDs have a track pitch of 0.74 μm for use with a 650 nm wavelength laser and an 0.60 NA optical head.

The above-noted areas 101 to 103 and 105 and 106 are further described below.

Figure 9:
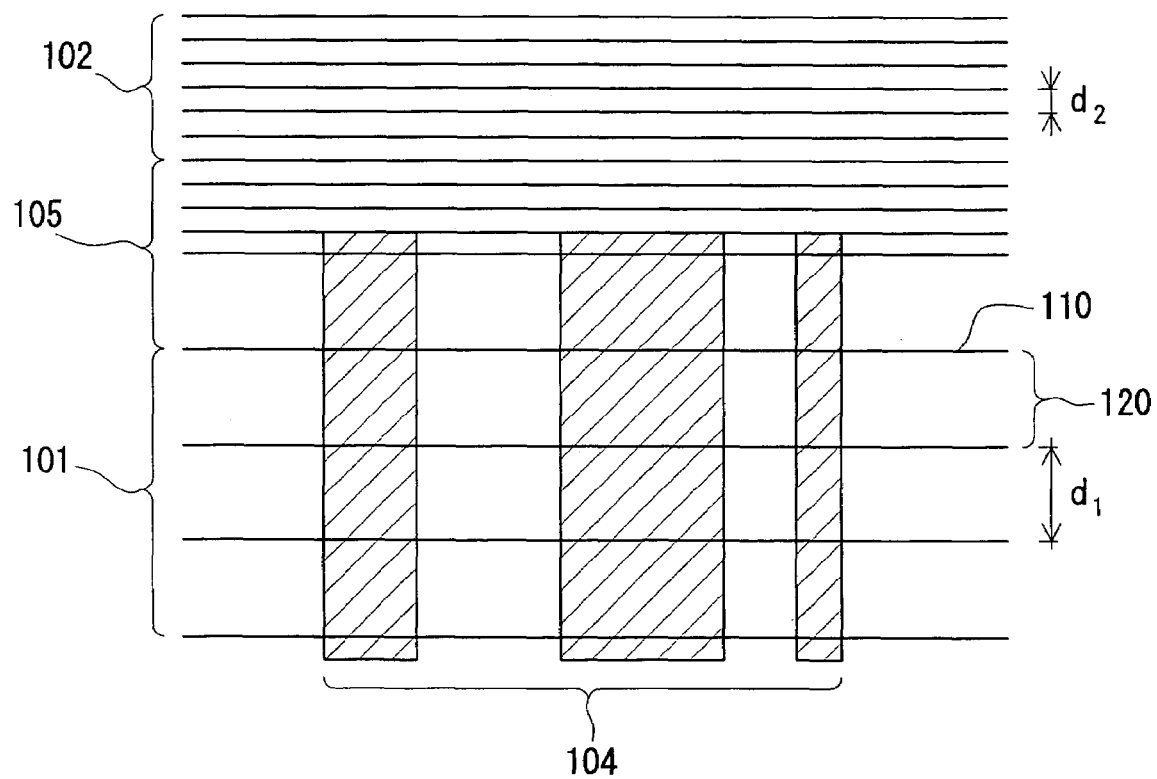
FIG. 9 is a schematic diagram of a barcode-shaped BCA mark in the BCA of an optical recording medium-according to the present invention.

The BCA 101 is disposed in a range within a radius of 21 mm to 22 mm from the disc center. BCA mark 104 is recorded in the BCA 101. The BCA mark 104 is a barcode representation of a serial number, lot number, or other such identifying information, and is used to identify the optical disc 100 and prevent unauthorized copies. BCA marks 104 are formed as barcode-shaped marks using two phases of the BCA 101: a crystalline phase area and an amorphous phase area of the phase-change stack. As shown in FIG. 9 the barcode-shaped marks are formed by plurality of linearly shaped marks arrayed in the circumferential direction in the BCA 101. The linearly shaped marks are extending in the radial direction across plural tracks. These barcode-shaped marks are sufficiently larger than the track pitch and cover the entire BCA 101 in the radial direction.

The read-only area 102 is disposed to an area within a 22.4 mm to 23.2 mm radius of the disc center, and is used to record disc information. Wobbled pregrooves are formed along the track in the read-only area 102 to record read-only data. In other words, the read-only data to be recorded is formed in the pregrooves. Only the disc information is read from the read-only area 102, and other information cannot be recorded in the read-only area 102. It should be noted that prepits modulated according to the playback signal can be used instead of pregrooves in the read-only area 102. It should also be noted that the read-only area 102 is not limited to read-only use, and could include write-once or read/write areas.

The read/write area 103 is disposed in the range from a 23.2 mm to 58.6 mm radius of the disc center. The user can both record information to and read information from the read/write area 103. Wobbled pregrooves are formed along the track for recording address information in the read/write area 103. User data is recorded to the track. It should be noted that address information can be recorded using prepits in the read/write area 103, and is thus not limited to pregrooves.

The first guard area 105 uninterruptedly connects tracks in the BCA 101 and tracks in the read-only area 102. More specifically, the track pitch in the first guard area 105 changes continuously from 2.0 μm at the inside part of the first guard area 105 to 0.35 μm, and thus seamlessly connects the tracks at a 2.0 μm pitch in the BCA 101 to tracks at a 0.35 μm pitch in the read-only area 102.

The track pitch in the second guard area 106 likewise changes from 0.35 μm to 0.32 μm, and thus similarly connects tracks at the 0.35 μm track pitch of the read-only area 102 to the tracks at a 0.32 μm track pitch in the read/write area 103.

Figure 3A:
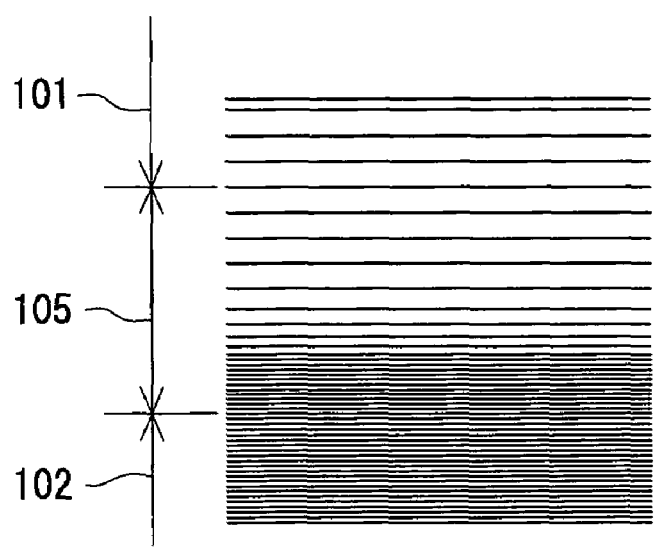
FIG. 3A shows a first example of a track pitch changing area according to the present invention.
Figure 3B:
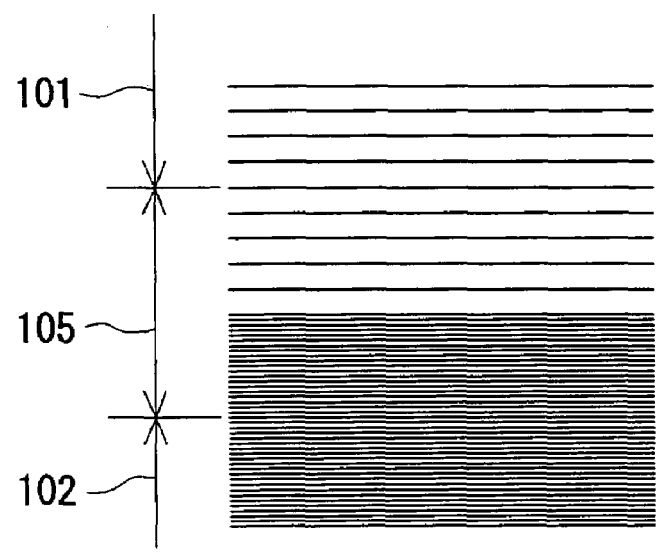
FIG. 3B shows a second example of a track pitch changing area according to the present invention.
Figure 3C:
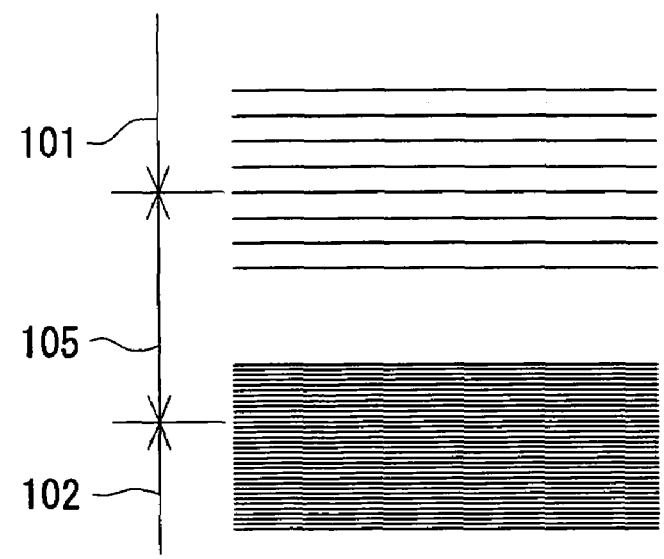
FIG. 3C shows a third example of a track pitch changing area according to the present invention.

The first guard area 105 is described more specifically with reference to FIGS. 3A to 3C. FIGS. 3A to 3C show the configuration of the first guard area 105. FIG. 3A shows a first example of the area where the track pitch changes. More specifically, the track is continuous from the BCA 101 to the read-only area 102, and this example thus illustrates the track pitch changing continuously.

If the amount of continuous change in the track pitch is great some manufacturing systems may not be able to manufacture a first guard area 105 as shown in FIG. 3A. In such cases a different configuration such as shown in FIG. 3B and FIG. 3C can be used.

FIG. 3B is a second example of an area where the track pitch changes. More specifically, tracks are formed at the track pitch of the BCA 101 in the first guard area 105, and the track is then interrupted at some midpoint position. Then from substantially the same location tracks are again formed but at the track pitch of the read-only area 102. The uniformity of the track pitch in the BCA 101 and in the read-only area 102 can be assured even in this second example.

FIG. 3C shows a third example of changing the track pitch. More specifically, tracks are formed at the track pitch of the BCA 101 in the first guard area 105, and are then interrupted. A mirror surface area of a specific width is then formed, and after this mirror surface area tracks are formed at the track pitch of the read-only area 102.

The change in the track pitch does not need to be continuous with the configurations shown in FIGS. 3B and 3C, and optical discs of these types can therefore be manufactured using conventional manufacturing equipment. It should be noted that the grooves are discontinuous between the BCA 101 and read-only area 102 in the cases shown in FIGS. 3B and 3C.

The present invention is described more fully below with reference to FIG. 1 and FIG. 9 to FIG. 13. FIG. 9 is a schematic diagram of the barcode-shaped BCA marks 104 in the BCA 101 on a optical disc 100 according to the present invention.

Figure 10:
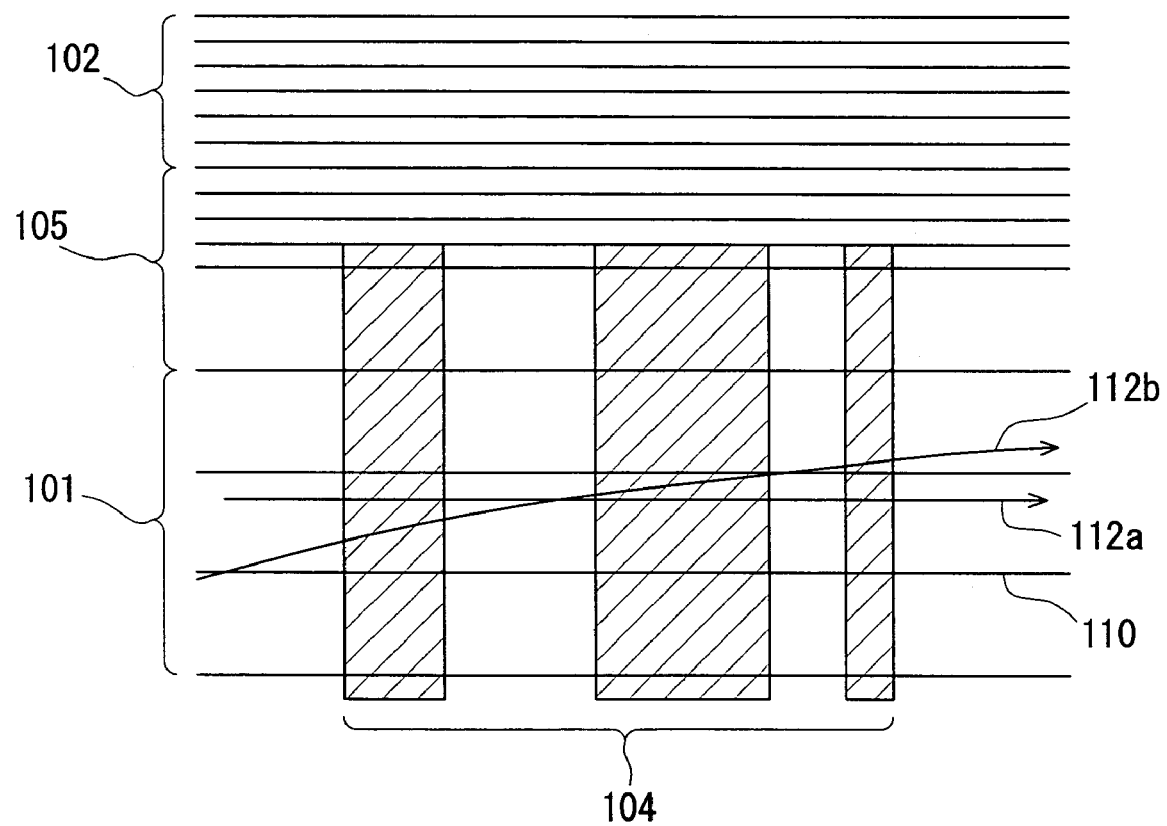
FIG. 10 is a schematic diagram of the path of the optical head while tracking is on and when tracking is off during the playback of a BCA mark in the BCA.

FIG. 10 is a schematic diagram of the paths 112a and 112b of the optical head while tracking is on and when tracking is off while reading the BCA marks 104 in the BCA 101.

Figure 11:
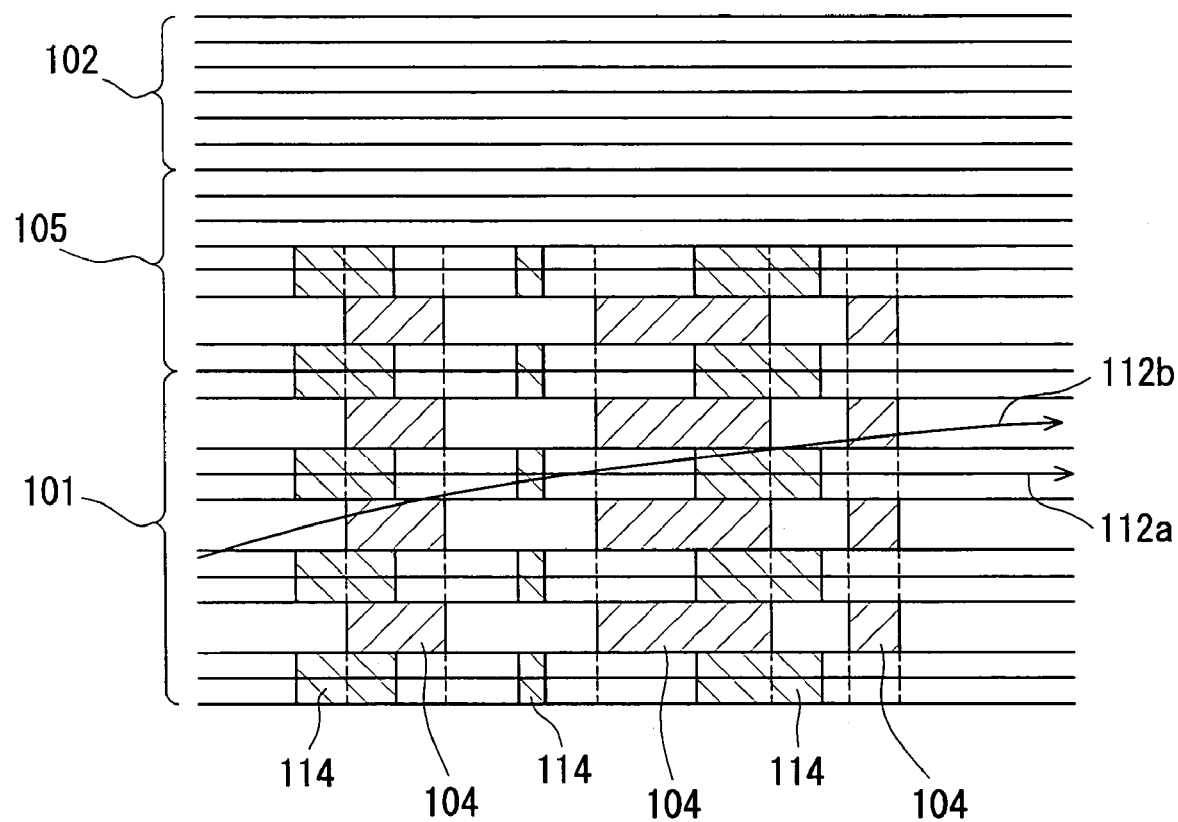
FIG. 11 is a schematic diagram of the path of the optical head while tracking is on and when tracking is off during the playback of a BCA mark that has been tampered with in the BCA of the optical recording medium shown in FIG. 9.

FIG. 11 is a schematic diagram of the paths 112a and 112b of the optical head when tracking is on and when tracking is off while reading BCA marks 104 that have been tampered with in the BCA 101 of the optical disc shown in FIG. 9.

Figure 12:
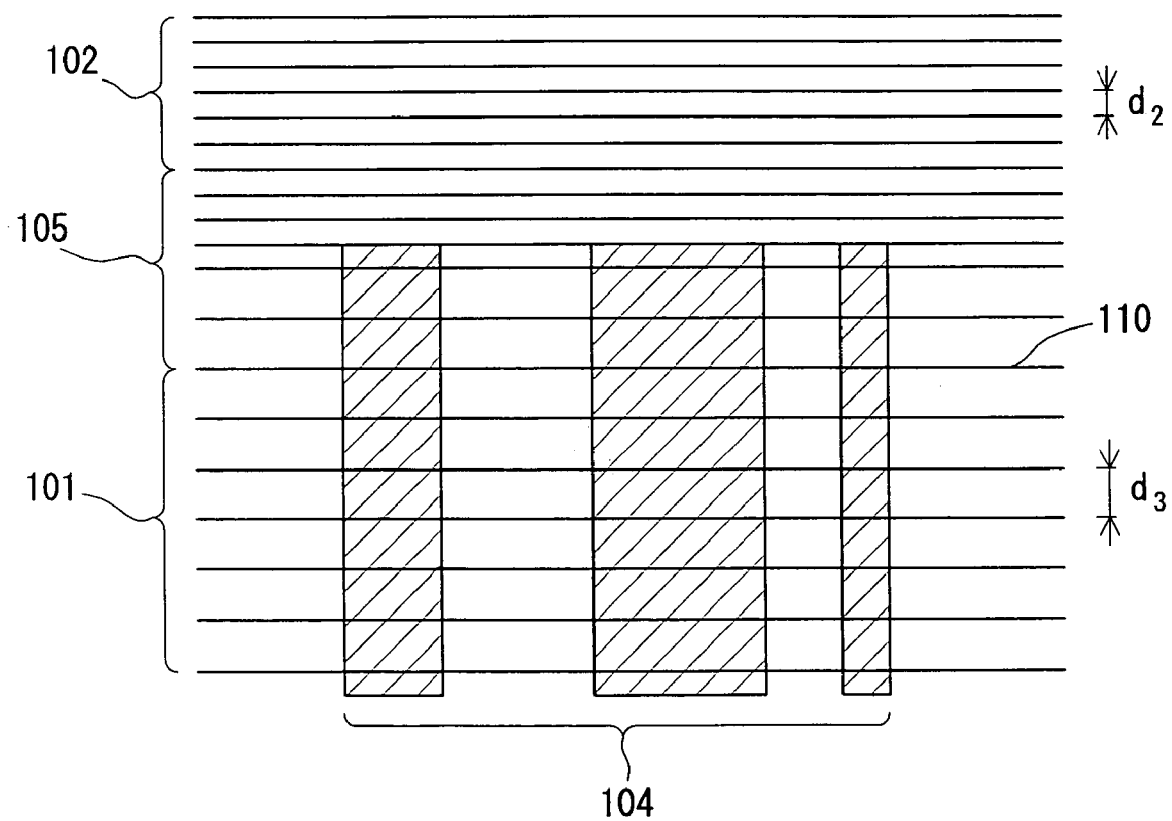
FIG. 12 is a schematic diagram of a barcode-shaped BCA mark in the BCA of an optical recording medium used by way of reference.

FIG. 12 is a schematic diagram of the barcode-shaped BCA marks 104 in the BCA 101 of an optical recording medium used for comparison.

Figure 13:
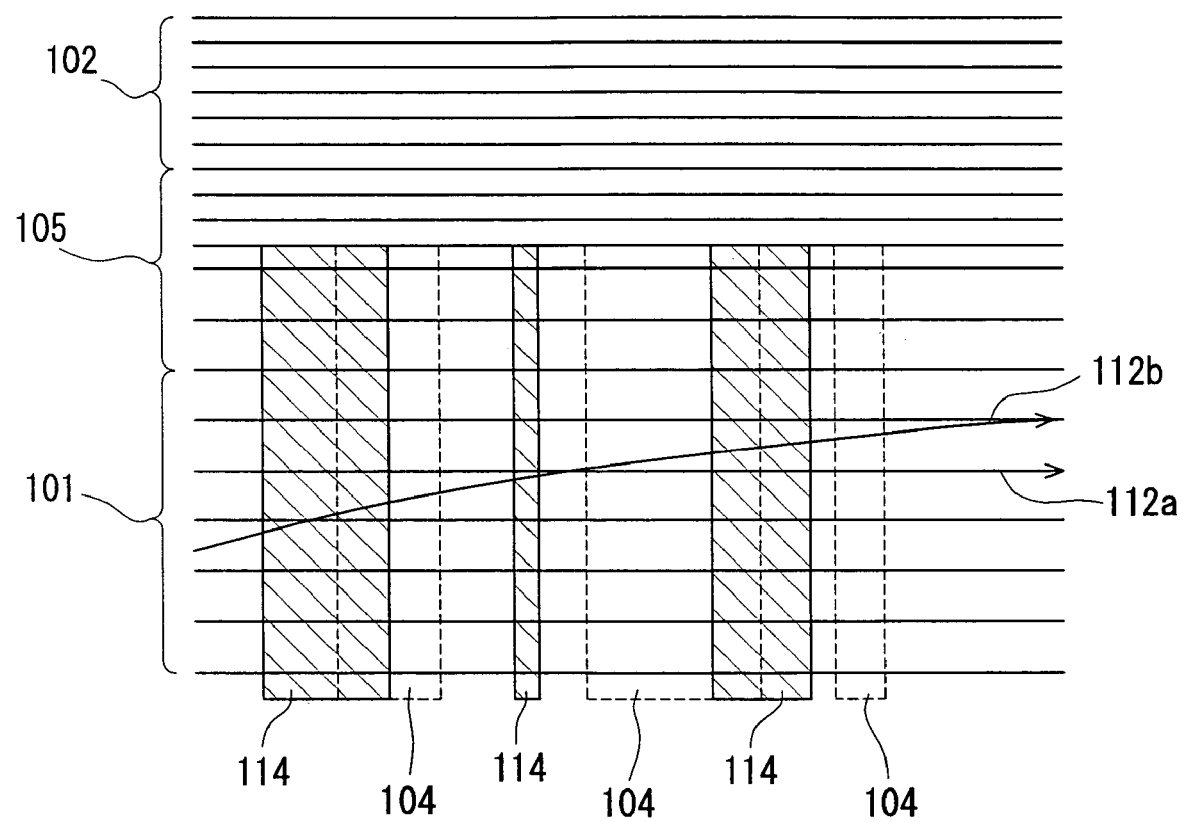
FIG. 13 is a schematic diagram of the path of the optical head while tracking is on and when tracking is off during the playback of a BCA mark that has been tampered with in the BCA of the optical recording medium shown in FIG. 12.

FIG. 13 is a schematic diagram of the paths 112a and 112b of the optical head when tracking is on and when tracking is off while reading BCA marks 104 that have been altered in the BCA 101 of the optical disc shown in FIG. 12.

A phase-change recording stack is formed on this optical disc 100 and is used to record information. It is important to note that a BCA mark 104 of a desired shape can be formed by emitting a laser to the phase-change stack in the BCA 101. This means that it is possible to alter the BCA marks 104. If the BCA marks 104 are altered, they will not function normally as identification information for preventing unauthorized copying. Tampering with the BCA marks 104 in the BCA 101 is therefore considered in detail next.

As shown in FIG. 10, tracking control enables the optical head 66 to normally trace a path 112a along the groove 110 to read BCA marks in the BCA. However, when the BCA mark is altered along the groove 110 with tracking control on, the BCA mark can be rewritten along the groove 110 to form an unauthorized BCA mark 114.

Tampering throughout the BCA 101 is considered next. As shown in FIG. 12 and FIG. 13, if the track pitch d3 in the BCA 101 is narrow relative to the read/write spot diameter of the optical head and tampering is attempted by tracking along the track groove 110, the unauthorized BCA mark 114 part of each track will also be uninterrupted in the radial direction. It is therefore possible in this case to form throughout the BCA 101 unauthorized BCA marks 114 having the same shape as the BCA marks pre-recorded to an original disc.

As shown in FIG. 9, however, the track pitch d1 in the BCA 101 is several times (such as five times) greater than the track pitch d2 in the read-only area 102 or read/write area 103 in an optical disc 100 according to the present invention. In this case even if a user attempts to tamper with the entire BCA 101 along the groove 110 by using tracking control, the unauthorized BCA marks 114 in each track will not be connected because the track pitch in the BCA 101 is sufficiently wide, and the original BCA marks 104 will remain in the land 120 parts as shown in FIG. 11. It is therefore not possible to alter the BCA marks so that they are sufficiently larger than the track pitch.

By thus making the track pitch d1 in the BCA sufficiently wider than the track pitch d2 in the read-only area 102 and other areas in an optical disc 100 according to the present invention, it is difficult to uniformly modify all of the barcode-shaped BCA marks 104 in the BCA 101.

It should be noted that the optical disc 100 is described above as a read/write type optical disc using a phase-change stack, but the present invention can also be applied to any disc in which the recording state can be changed using an optical head, including write-once discs, to prevent data from being read by unauthorized users.

(2) Disc Master Production Process

FIGS. 2A to 2E show the basic steps (a) to (e) in the production of a master for the optical disc 100 as shown in FIG. 1 and described below.

Figure 2A:
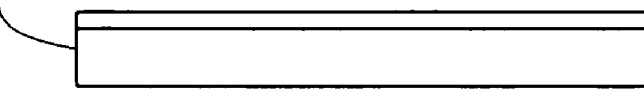
FIGS. 2A to 2E illustrate steps in the production of a master disc for an optical disc.

(a) The first step is to evenly coat the surface of a glass plate 201 with a photosensitive material (such as a positive resist) (see FIG. 2A).

Figure 2B:
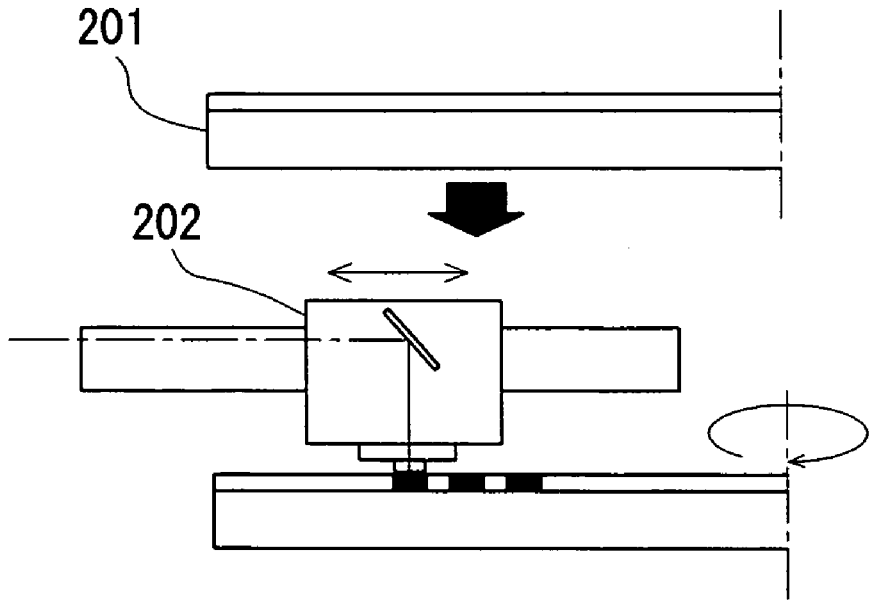
Figure 2C:
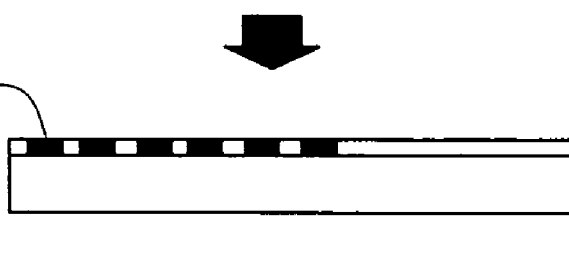

(b) A pregroove pattern is then formed using a laser beam recorder (LBR) 202 emitting a 248 nm wavelength deep-ultraviolet laser (see FIG. 2B). The laser beam recorder 202 forms the pregroove pattern based on a signal from a formatter (not shown in the figure) that generates a signal according to the desired pregroove pattern.

The laser beam recorder 202 is described more specifically below. The laser beam recorder 202 has an encoder (not shown in the figure) for detecting movement in the radial direction. The control circuit (not shown in the figure) of the laser beam recorder 202 can calculate the distance moved based on a predetermined pulse interval and the actually detected number of pulses from the encoder. The control circuit then controls movement so that the pulse count from the encoder matches the pulse count that should be detected within a specified time according to the set track pitch.

The laser beam recorder 202 starts forming the groove at a first pulse count setting equivalent to the track pitch (2.0 μm) of the BCA 101 from the inside radius of the BCA 101 (see FIG. 1) or a point to the inside of this inside radius. When groove exposure advances into the first guard area 105 (FIG. 1), the laser beam recorder 202 switches to a second pulse count setting equivalent to the track pitch (0.35 μm) of the read-only area 102. (see FIG. 1). This makes it possible to change the track pitch in the first guard area 105 without interrupting the track. The read-only area 102 is thereafter exposed at this second pulse count setting to form grooves at a uniform track pitch throughout the read-only area 102. As noted above, the track pitch in the read-only area 102 (FIG. 1) is 0.35 μm and the track pitch in the BCA 101 is 2.0 μm, that is, at least five times greater than the track pitch of the read-only area 102. It is therefore difficult to uniformly alter the barcode-shaped marks in their entirety in the BCA 101.

It should be noted that the first pulse count setting could alternatively be increased or decreased continuously to the second pulse count setting. In this case the track pitch will change continuously throughout the first guard area 105.

(c) The laser beam recorder 202 similarly changes in the second guard area 106 (FIG. 1) from the second pulse count setting equivalent to the track pitch of the read-only area 102 to a third pulse count setting equivalent to the track pitch (0.32 μm) in the read/write area 103. The track pitch can thus be varied without interrupting the track in the second guard area 106, and the read/write area 103 can thereafter be uniformly exposed at a specific track pitch. Exposure ends at the outside circumference radius of the read/write area 103. A latent image 203 with the desired groove pattern is thus recorded to the glass plate 201 by the above steps (see FIG. 2C).

Figure 2D:
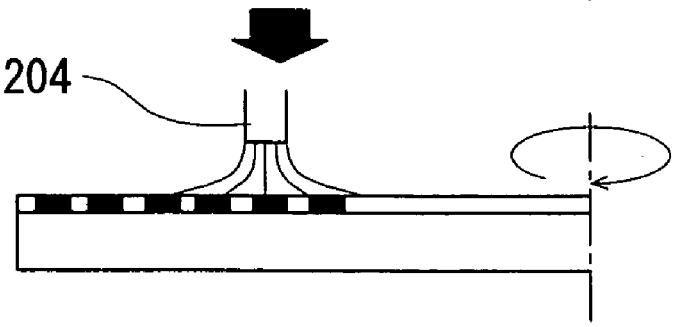

(d) The plate is then spun while dispensing spraying it with developer solution from a developer nozzle 204 to develop the latent image (FIG. 2D).

Figure 2E:
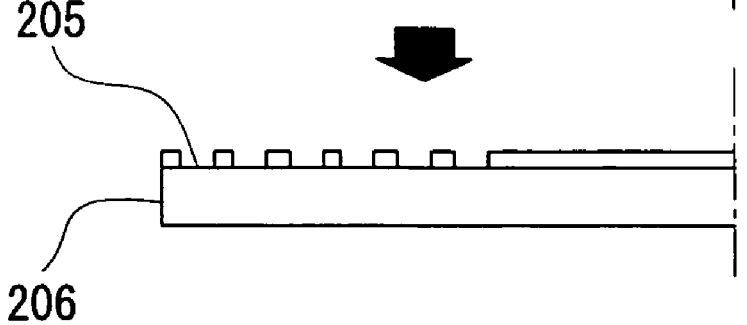

(e) The developed plate is then dried to obtain a disc master 206 with the desired groove pattern 205 (FIG. 2E).

(3) Manufacturing an Optical Disc Using the Disc Master

FIGS. 4A to 4F and FIGS. 5A to 5F show the steps in the production of an optical disc from the disc master. FIGS. 4A to 4F show the steps in the production of a stamper from the disc master, and FIGS. 5A to 5F show the steps for producing the optical disc from the stamper.

FIGS. 4A to 4F are referred to first.

Figure 4A:
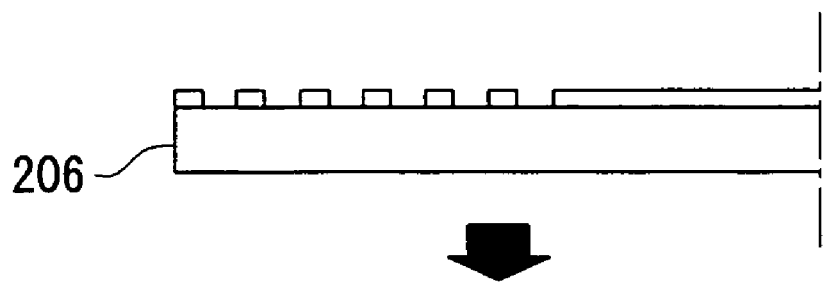
FIGS. 4A to 4F show steps in the production of an optical disc stamper.
Figure 4B:
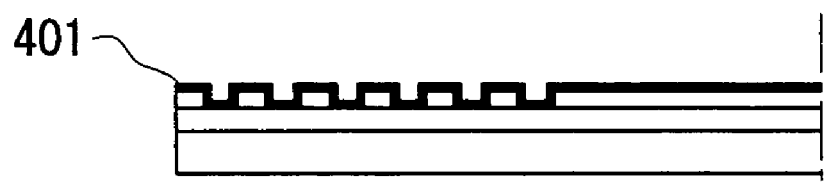

(a) A nickel film 401 is first formed on the disc master 206 (FIG. 4A) by sputtering (FIG. 4B).

Figure 4C:
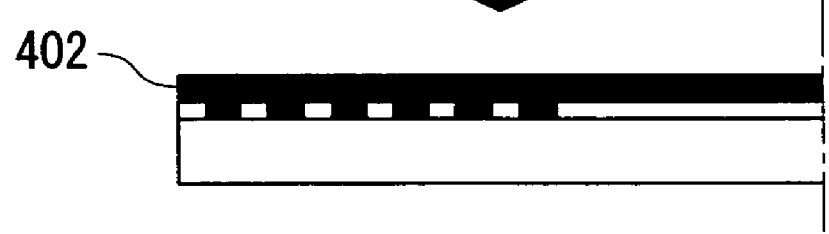

(b) The master is then nickel plated using the nickel film 401 as the electrode, resulting in a nickel thin plate 402 on the master surface (FIG. 4C).

Figure 4D:
Figure 4E:
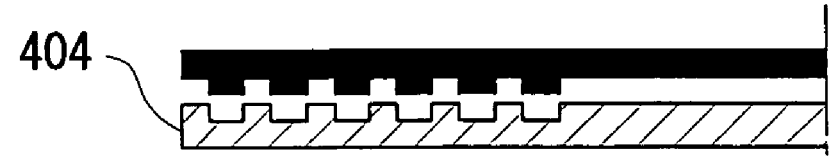

(c) The thin plate 402 is then separated and the resist removed to obtain an approximately 0.3 mm thick nickel master plate (the "father" below) 403 to which the desired groove pattern has been transferred (FIG. 4D).

Figure 4F:

(d) The father 403 is then nickel plated again and the nickel plate is similarly removed (FIG. 4E) to obtain an approximately 0.3 mm thick nickel master plate (the "mother" below) 403 to which the groove pattern from the father 403 has been transferred (FIG. 4F). The back of the mother 404 is then polished and the mother 404 is stamped to a desired shape to obtain a die (stamper) 405 with the desired groove pattern.

The remaining process is described with reference to FIGS. 5A to 5F.

Figure 5A:
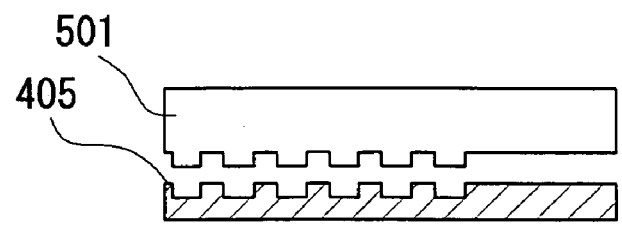
FIGS. 5A to 5F show steps in the process for producing optical discs from the stamper.

(e) The stamper 405 is installed to the injection molding machine for injection molding using a polycarbonate material to produce a 1.1 mm thick molded substrate 501 to which the desired groove pattern has been transferred (see FIG. 5A).

Figure 5B:

(f) A phase-change recording stack 502 of primarily Ge—Sb—Te is then stacked by sputtering onto the pattern transfer side of the molded substrate 501 (see FIG. 5B).

Figure 5C:
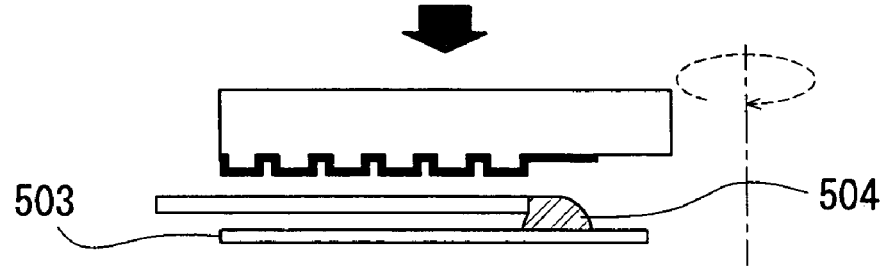

(g) An approximately 90 μm thick polycarbonate sheet 503 is then placed on a spin coater and a UV curable resin 504 is then dripped thereon (FIG. 5C).

Figure 5D:
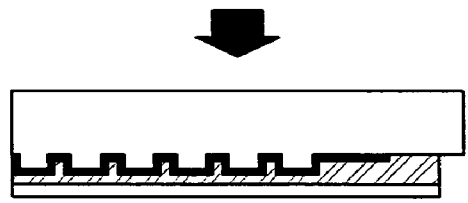

(h) After piling the substrate on so that the surface with the phase-change recording stack faces the polycarbonate sheet, the spin coater is turned to spin off excess UV curable resin. The spin coater is stopped when the UV curable resin is approximately 10 μm thick (FIG. 5D).

Figure 5E:
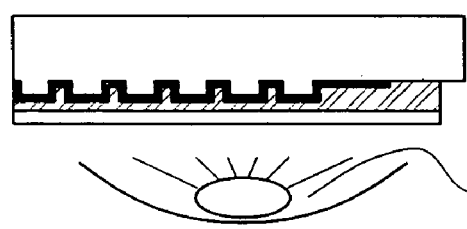
Figure 5F:
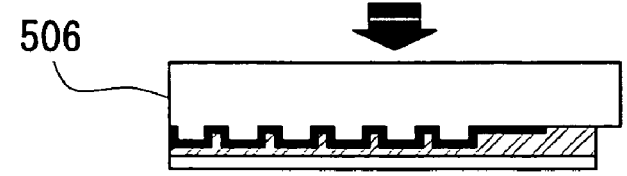

(i) UV light is then emitted from the UV source 505 to set the UV curable resin 504 (FIG. 5E).

(j) After these steps are completed an optical disc 506 with a transparent cover layer enabling reading and writing is obtained (FIG. 5F) from the disc master 206 (FIG. 4A).

(4) BCA Mark Formation

The entire phase-change recording stack 502 surface of the optical disc is in the amorphous state after being formed by sputtering as described above, and a process generally referred to as initialization is required to crystallize the data recording area. A disc initializer having a high output laser with a wavelength of at least 650 nm is then used to crystallize the data recording areas 101 to 103 of the optical disc (FIG. 1). The disc can be uniformly initialized by scanning the entire surface with uniform light while spinning the disc.

Referring to FIG. 1, the laser beam is repeatedly switched on and off in the BCA 101 according to the barcode pattern (for information such as the serial number or copy prevention information) to be recorded. By leaving uninitialized amorphous state parts on the disc, a barcode-shaped pattern of crystalline phase and amorphous phase parts is recorded as the BCA mark 104. An optical disc 100 containing BCA marks 104 can thus be manufactured.

It should be noted that the initialization process for forming the BCA marks 104 is described in this embodiment of the invention as occurring after the protective surface layer is formed. It will be obvious, however, that disc initialization and BCA mark 104 formation could precede forming the cover layer, and the protective layer could be formed after initialization to complete the optical disc 100.

(5) Optical Disc Playback

Figure 6:
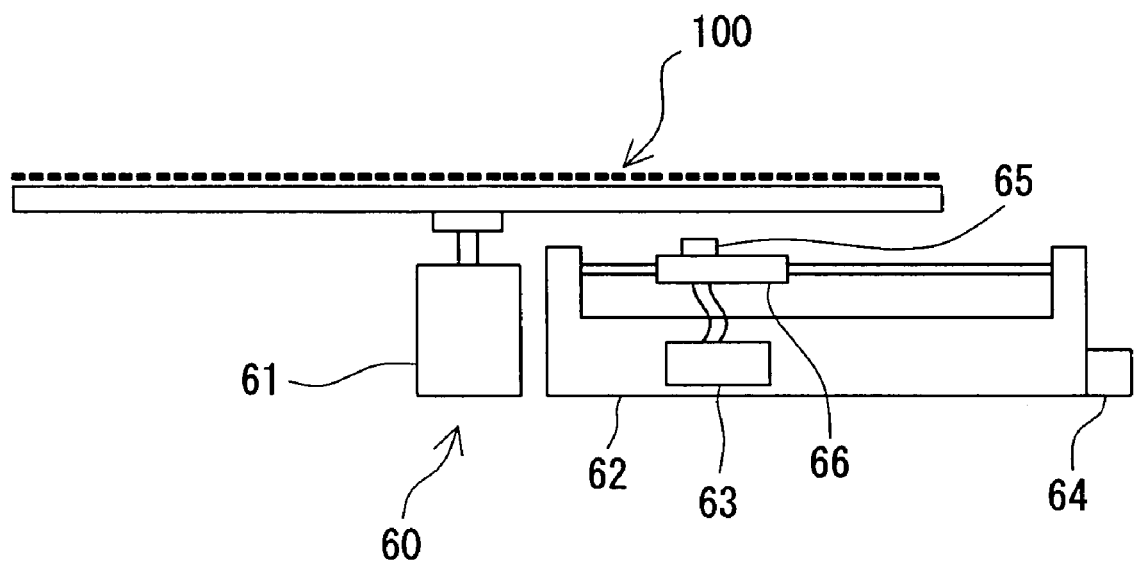
FIG. 6 is a block diagram of the configuration of a playback device according to a preferred embodiment of the present invention.

FIG. 6 is a block diagram of the configuration of a playback device 60 for reading this optical disc 100. An optical disc 100 set on the turntable of the playback device 60 is turned by the rotational drive unit 61. The optical head 66 sends a signal corresponding to its position relative to the optical disc 100 to the control unit 63. The control unit 63 amplifies or otherwise manipulates this signal to tune the position of the optical head 66 or objective lens inside the optical head 66. The drive unit 62 drives the optical head 66. The objective lens drive unit 65 drives the objective lens inside the optical head 66. The control unit 63 reads information from the optical disc 100 by controlling a focusing servo and tracking servo using signals from the optical head 66 and the drive unit 62 [82, sic] and/or objective lens drive unit 65 [85, sic]. It should be noted that writing and erasing information can be done using the same equipment. The connector 64 is for connecting an internal or external power source. Power is supplied from the connector 64 to the control unit 63, optical head 66 drive unit 62, rotational drive unit 61, and objective lens drive unit 65.

The playback operation is described more specifically below.

When an optical disc 100 is placed on the turntable (not shown in the figure), the playback device 60 sets the 0.85 NA optical head 66 in proximity to the optical disc 100 and emits a 405 nm wavelength laser. The laser beam emitted to and reflected from the optical disc 100 is then detected by the optical head 66 and passed to the control unit 63 for focusing servo control. The control unit 63 detects a push-pull tracking signal to track and read information from the location on the optical disc 100 where the information to be read is recorded.

Figure 7A:
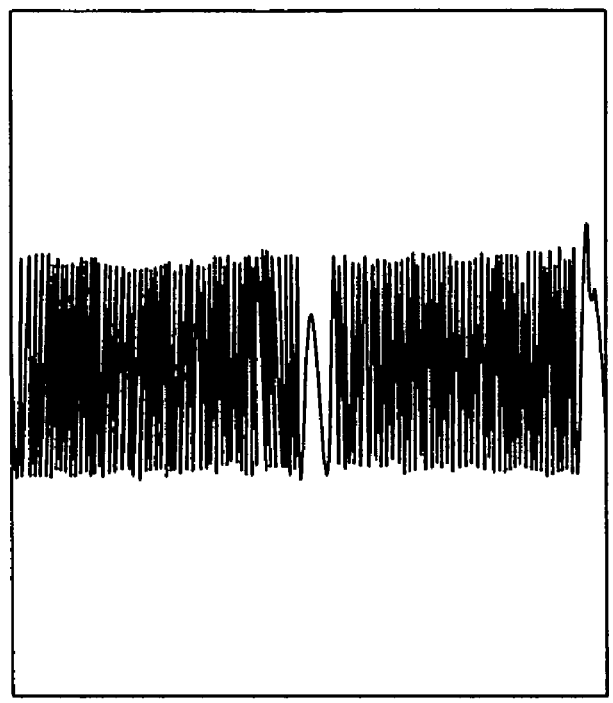
FIG. 7A is a waveform diagram of the playback wave of a tracking error signal in the read/write area.
Figure 7B:
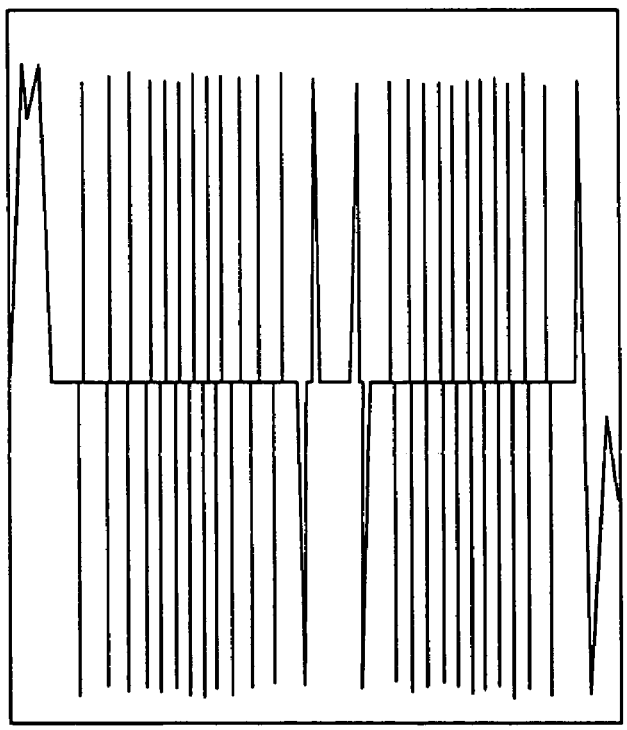
FIG. 7B is a waveform diagram of the playback signal of a tracking error signal in the BCA where the BCA mark is recorded.

FIG. 7A shows the reproduced waveform of the tracking error signal in the read/write area 103 (FIG. 1). It will be obvious that the playback waveform is a sine wave. FIG. 7B shows the playback waveform from the BCA 101 (FIG. 1) where the BCA marks 104 (FIG. 1) are recorded. Because the recorded groove width is narrow compared with the track pitch or diameter of the read spot 70 of the optical head 66 (FIG. 6), the playback signal from the BCA 101 (FIG. 1) is not a sine wave. The tracking error signal when the groove is crossed is sufficiently steep, however, and the groove can therefore be followed by the tracking servo.

Figure 8A:
FIG. 8A is a schematic diagram of the barcode-shaped mark in a groove in the BCA.
Figure 8B:
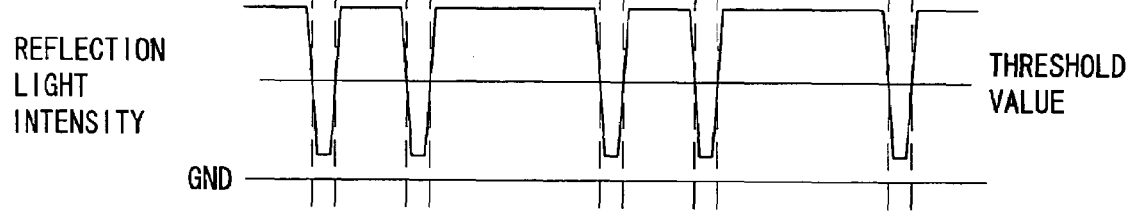
FIG. 8B shows the change in the intensity of reflected light detected by the optical head from the barcode-shaped mark shown in FIG. 8A.
Figure 8C:
FIG. 8C shows the change in the signal strength of the playback signal generated from the change in light intensity shown in FIG. 8B.

FIGS. 8A to 8C show the change in the intensity of the reflected light detected by the optical head 66 (FIG. 6) when the tracking servo is functioning. Because reflectivity in the amorphous phase part of the phase-change recording stack in the BCA 101 (FIG. 1) is low (such as half or less) compared with reflectivity in the crystalline phase parts, the strength of reflections detected in the BCA 101 is modulated according the pattern of the BCA mark. It is therefore possible for the playback device 60 (FIG. 6) to recognize the pattern of the BCA marks 104 (FIG. 1) and read information from the pattern by setting a specific threshold value and determining whether the strength of the detected reflection is greater than or less than the threshold value. It should be noted that the actual tracking servo preferably uses a tracking error signal normalized for the strength of the reflections in order to prevent the tracking error signal from being affected by the strength of the reflections.

A method for reading BCA marks 104 (FIG. 1) in the BCA 101 of this optical disc 100 is considered next. These BCA marks 104 can be read by tracking as described above. We also discovered that by forming the BCA marks 104 over a wide range in the radial direction across plural tracks of the BCA 101, the optical head 66 (FIG. 6) can be reliably positioned in the BCA 101 (FIG. 1) so that the BCA marks can be read. In other words, we discovered that the control unit 63 can also detect information from change in the strength of the laser reflections even when the tracking servo is not operating (i.e., when tracking is off). In this tracking-off mode information can be detected by scanning the optical disc 100 while holding the optical head 66 stationary, for example.

How BCA marks 104 in the BCA of the optical disc 100 are altered is considered next.

There are two general ways of tampering with the BCA marks: the first method uses tracking control and the second method turns tracking off. To prevent tampering with first method, i.e., with tracking control, the track pitch d1 of the BCA 101 is set to a certain multiple greater than the track pitch of the read-only area 102 (FIG. 1) or read/write area 103 (FIG. 1). This multiple is preferably five times or more. The track pitch d1 of the BCA 101 is also preferably sufficiently greater than the spot diameter of the optical head. This makes it difficult to change the entire BCA 101 even if a third party attempts to tamper with the BCA marks 104 using a drive that can record data, such as a CD-R or CD-RW drive.

If tampering is attempted using the second method turning tracking off, the path 112b of the optical head 66 while tampering does not follow the groove 110, and the original BCA marks 104 will therefore remain in the area along the groove 110.

A method for detecting tampering with the BCA marks 104 is described next.

Altering the entire BCA 101 can be prevented by setting the track pitch d1 of the BCA in a specific range as described above. While unauthorized BCA marks 114 can be read when reading the BCA marks with tracking control as in the prior art, it has not been possible to detect whether the read mark had been altered.

We discovered, however, that when the BCA marks are read with tracking off, a different place is read than when reading the BCA marks with tracking on.

A novel feature of the optical disc playback method of the present invention is therefore that alteration of the original BCA marks is detected by comparing the mark information obtained by reading the BCA mark with tracking on with the mark information obtained by reading the BCA mark with tracking off.

A method according to the present invention for detecting alteration of the BCA marks 104 in the BCA 101 of this optical disc 100 and playing the optical disc only when there has been no tampering is therefore described next.

(a) The BCA marks 104 are read using the optical head 66 without tracking the groove 110 of the BCA 101, that is, with tracking off, to get the mark information when tracking is off.

(b) The BCA marks 104 are then read again using the optical head 66 while tracking the track in the BCA 101 to get the mark information when tracking is on.

(c) The control unit 63 then compares the playback waveform of the mark information reproduced when tracking is off with the playback waveform of the mark information reproduced with tracking on.

(d) If the playback waveforms are determined to differ, it is known that altering the BCA marks was attempting using either the first or second tampering method described above. The control unit 63 of the playback device 60 recognizes the disc as an original, authentic disc only if the mark information detected with tracking on matches the mark information detected with tracking off.

(e) Reading the information recorded to the read-only area 102 is then permitted, for example. If the mark information does not match, the control unit 63 identifies the disc as a disc that has been tampered with, and reading the optical disc is therefore prohibited.

It should be noted that either playback waveform could be detected first, but the marks are generally read first without tracking and then with tracking.

It should be noted that the optical head follows a different path 112b when reading the BCA marks with tracking off than the path 112a when tracking is on because of eccentricity, that is, the offset between the center of rotation in the read/write system and the center of the optical recording medium. This eccentricity is approximately +/−50 μm, causing the path 112b when tracking is off to shift in the radial direction from the groove 110 by the amount of eccentricity compared with the path 112a when tracking is on. This results in lands 120 other than those along the groove 110 that are scanned with tracking on to also be scanned when tracking is off.

Separate methods for detecting tampering by comparing mark information obtained with tracking on and with tracking off are described below to determine whether the marks were altered by the above first or second tampering methods.

If the marks are altered while tracking the pregroove using the first tampering method above, the pregroove will be altered and an unauthorized BCA mark 114 will be written as shown in FIG. 11. In this case, however, the original BCA mark 104 also remains between the lands 120. As a result, when the BCA marks 104 are read along the pregroove with tracking on, the mark information from the altered unauthorized BCA marks 114 will be read because the optical head path, 112a follows the groove 110. However, because the path 112b when tracking is off shifts equivalently to the eccentricity from the groove 110 in the radial direction, both the unauthorized BCA marks 114 and remaining original BCA marks 104 will be read. The read mark information thus contains both mark information from the original BCA marks 104 and mark information from the unauthorized BCA marks 114, and thus differs from the mark information read with tracking on. If the mark information is then compared and found to differ, the marks are known to have been altered.

Because alteration occurs when tracking is off with the above second tampering method, the mark information read when tracking is off is based on the unauthorized BCA marks 114, and the mark information read when tracking is on includes both mark information based on the original BCA marks 104 and mark information from the unauthorized BCA marks. While this is the opposite of the above case, tampering can still be detected by comparing the mark information and detecting if the information is the same.

In an optical recording medium according to the present invention the track pitch of tracks in a BCA region is wider than the track pitch of tracks in a read-only region or read/write region of the disc, and is preferably at least five times wider. This makes it possible in an optical disc or other optical recording medium to read barcode-shaped BCA marks in a BCA region with tracking while also making it difficult to alter or tamper with the BCA marks.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. An optical recording medium comprising:
   a first area containing tracks with a first track pitch; and
   a second area containing tracks with a second track pitch;
   wherein a plurality of barcode-shaped marks are formed in the second area, and the second track pitch is at least five times wider than the first track pitch.

2. An optical recording medium according to claim 1, wherein the barcode-shaped marks are linearly shaped marks arrayed in a circumferential direction and extending in a radial direction across multiple tracks in the second area.

3. An optical recording medium according to claim 1, wherein the second area has prepits or pregrooves formed therein along the track.

4. An optical recording medium according to claim 1, wherein the second area has a stack for recording information.

5. An optical recording medium according to claim 4, wherein the stack for recording information is a phase-change recording stack, and
   the marks are formed by a pattern using both a crystalline phase and amorphous phase of the phase-change recording stack.

6. An optical recording medium according to claim 1, wherein uninterrupted prepits or pregrooves are formed in the first area and in the second area.

7. An optical recording medium according to claim 2, wherein the second area has a stack for recording information.

8. An optical recording medium according to claim 3, wherein the second area has a stack for recording information.

9. An optical medium according to claim 1, further comprising:
   a third area, between the first area and the second area, containing tracks with a third track pitch,
   wherein the third area is a read-only area used to record disc information, and the first area is a read/write area which information can be recorded to and can be read from, and
   the third track pitch is wider than the first track pitch and smaller than the second track pitch.

* * * * *

UNITED STATES PATENT AND TRADEMARK OFFICE
CERTIFICATE OF CORRECTION

PATENT NO. : 7,616,552 B2
APPLICATION NO. : 10/504292
DATED : November 10, 2009
INVENTOR(S) : Abe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this

Nineteenth Day of October, 2010

David J. Kappos
*Director of the United States Patent and Trademark Office*